UNITED STATES PATENT OFFICE.

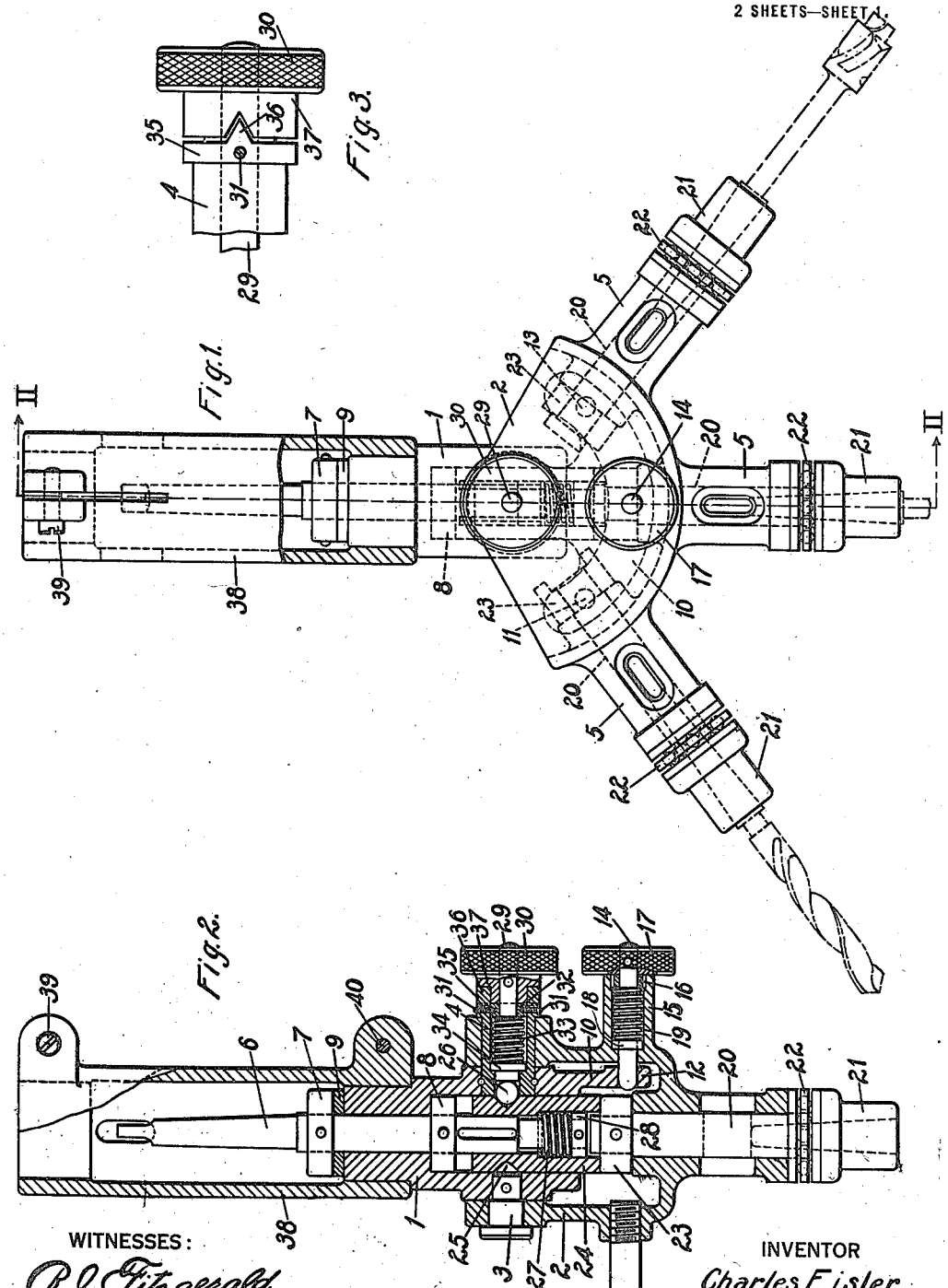

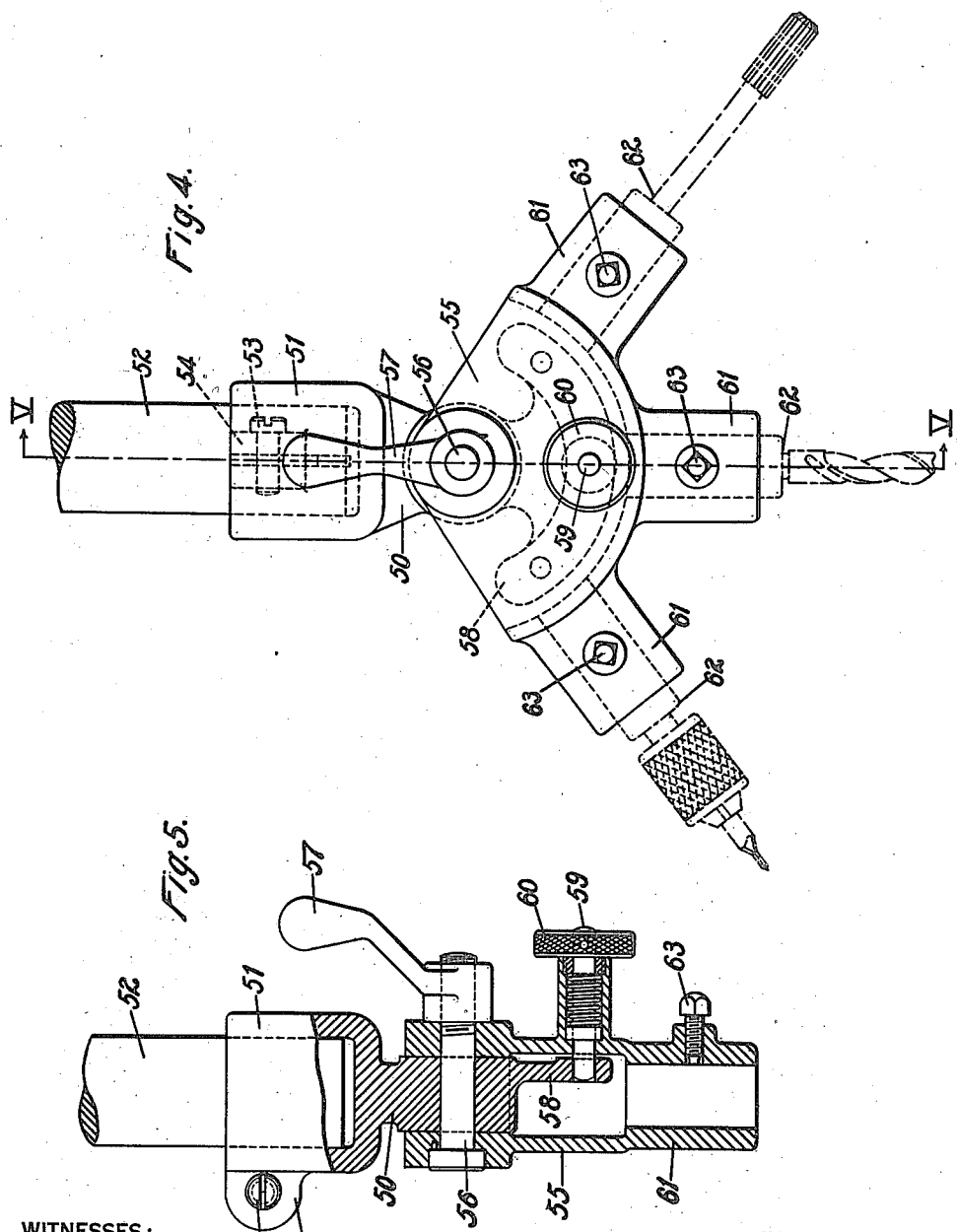

CHARLES EISLER, OF BLOOMFIELD, NEW JERSEY.

TURRET ATTACHMENT FOR MACHINE-TOOLS.

1,209,650.  Specification of Letters Patent.  Patented Dec. 19, 1916.

Application filed January 18, 1916. Serial No. 72,743.

*To all whom it may concern:*

Be it known that I, CHARLES EISLER, a citizen of the United States, and a resident of Bloomfield, in the county of Essex and State of New Jersey, have invented a new and useful Improvement in Turret Attachments for Machine-Tools, of which the following is a specification.

My invention relates to turret attachments for drill presses, lathes and other machine tools, and it has for its object to provide an attachment of the character indicated which shall be strong and simple in construction and convenient in operation, and in which the several tools carried by the turret may be rapidly and easily selected and set in accurate working position.

More specifically, an object of my invention is to provide a turret attachment for machine tools consisting essentially of a swinging casing member or head carrying a plurality of radially-extending tool chucks, the axes of all of the tool chucks being disposed in a plane which also includes the axis of rotation of the main driving spindle.

Two modifications of turret attachments constructed in accordance with my invention are illustrated in the accompanying drawings, in which—

Figure 1 is a front elevational view of a turret attachment adapted for use with drill presses and other machine tools having rotary driving spindles; Fig. 2 is a vertical sectional view of the structure shown in Fig. 1, the section being taken substantially along the line II—II, Fig. 1; Fig. 3 is an elevational view showing a detail of the structure of Figs. 1 and 2; Fig. 4 is a front elevational view of a form of my device adapted for use with lathes or other machine tools in which the work is rotated in contact with a stationary tool, and Fig. 5 is a vertical sectional view of the structure shown in Fig. 4, the section being taken substantially along the line V—V, Fig. 4.

Each of the attachments shown herein consists of a relatively stationary support, to which is pivotally attached a hollow segmental tool-carrying member that is adapted to move through only a restricted arc around a pivotal axis which is perpendicular to the longitudinal axis of the support and of the main driving spindle, if such a spindle is provided. This arrangement of the parts, in which the axes of the several tools are always in the same plane with the axis of the driving spindle, adds greatly to the strength and rigidity of the device. In the form of device in which positive rotation of the tools is provided, I employ a special form of clutch for connecting the selected tool with the driving spindle, together with means for quickly and positively engaging and releasing the clutch.

The device shown in Figs. 1 to 3 of the drawings comprises a stationary support or housing 1 and a swinging segmental head 2 which is pivotally hung from a pin 3 and a sleeve 4 attached to the housing 1. The segmental head 2 is provided with radial bearing arms 5 which carry the several tool spindles of the attachment, and a main tapered driving spindle 6 is received in a bearing formed in the housing 1 and is secured therein by means of collars 7 and 8 and a thrust washer 9.

Depending from the lower end of the housing 1 is an arcuate plate 10 provided with three equally spaced indexing perforations 11, 12 and 13, which coöperate with a plunger 14 carried by the segmental head 2 to bring any selected tool into alinement with the driving spindle 6. The plunger 14 extends through an opening in the front wall of the member 2 and slides within a sleeve 15, the outer end of which is closed by a plug 16 having a central perforation to admit the plunger 14. A knob 17 is attached to the outer end of the plunger, and a collar 18 is secured to an intermediate point thereon, to confine a helical spring 19 against the plug 16. The spring 19 serves to press the plunger 14 toward the indexing plate 10. Each of the bearing arms 5 attached to the segmental member 2 carries a tool-spindle 20 which drives a chuck 21 running upon a thrust bearing 22. A clutch member 23 is attached to the upper end of each of the spindles 20.

Slidably keyed to the lower end of the main driving spindle 6 is a clutch sleeve 24, which is provided near its upper end with an external V-shaped annular groove 25, into which a ball 26 is pressed to move the sleeve downward into its clutching position. This downward movement is resisted by a helical spring 27 which surrounds the spindle 6 and which is confined between a collar 28, fastened to the lower end of the spindle, and an internal shoulder formed in the sleeve 24.

The ball 26 is forced into the groove 25 by means of a plunger 29 which is manipulated by means of a knob 30. The plunger 29 is inclosed within the pivot sleeve 4, to which is attached, by means of set screws 31, a stationary collar 32, which forms an abutment against which rests one end of a helical spring 33. The other end of the spring 33 rests against a collar 34 carried by the plunger 29 near its inner end. The pivot sleeve 4 carries, at its outer end, a collar 35 having one or more V-shaped projections 36 that fit within correspondingly shaped notches formed in a sleeve 37 which is attached to the knob 30, as best shown in Fig. 3. The spring 33 tends to press the end of the plunger against the ball 26 to force the ball into the groove 25, and this pressure is relieved by pulling the knob 30 and turning it partly around, so that the projection 36 rests against the edge of the sleeve 37. The spring 33 should be considerably stronger than the spring 27.

For clamping the attachment to the spindle of the drill press or other machine tool with which it is used, I provide a sleeve 38, which is secured to the drill press spindle and to the housing 1 by means of screws 39 and 40, respectively. When the sleeve 38 is not employed, the attachment may be prevented from rotating bodily by means of a stop 41, which is attached to the member 2 and is adapted to rest against any stationary part of the machine tool. The sleeve 38 is usually somewhat preferable to the stop 41, since it permits the attachment to be adjusted to any desired angle around the axis of the driving spindle.

In the operation of this form of my device, the attachment is secured to a suitable machine tool with the main driving spindle 6 properly attached to the driving column of the machine, the sleeve 38 or the stop 41 being adjusted to restrain the attachment from bodily rotation. The machine is then set in motion. If one of the drill spindles 25 is in engagement with the clutch sleeve 24, as shown in Fig. 1, and if it is desired to make use of another tool, the active tool spindle is stopped, without stopping the machine, by pulling the knob 30 and turning it through about one quarter of a revolution, thus releasing the pressure of the ball 26 in the groove 25. The clutch sleeve 24 is instantly moved upward by the spring 27, out of engagement with the tool spindle 20, the spring 27 thus performing the function of biasing the clutch sleeve 24 to its inoperative position. Another tool spindle may then be quickly selected and put in operation by pulling the knob 17 and swinging the head 2 to bring the plunger 14 opposite to the proper opening in the indexing plate 10. The knob 30 is then turned to bring the notch in the collar 37 into engagement with the projection 36. The spring 33, being stronger than the biasing spring 27, forces the plunger 29 against the ball 26 and thereby thrusts the sleeve 24 downward into driving engagement with the clutch member 23 of the selected tool spindle. It will be observed that the several tools of the turret may be used in succession without requiring the operator to leave his working position in order to engage and disengage the tools.

The modified device shown in Figs. 4 and 5 of the drawing is particularly designed for use upon the tail stock of a lathe. It comprises a stationary support 50, having a preferably integral socket member 51 which fits over the center steady-rest spindle 52 of the lathe and is clamped thereon by means of a screw 53 and clamping ears 54. A hollow segmental tool head 55 is rigidly attached to a pivot bolt 56 which fits rotatably in an opening through the support 50, and which is threaded at its front end to receive an adjusting handle 57. The support 50 carries a depending arcuate indexing plate 58, which is similar to the plate 10 described above, and which is similarly provided with indexing perforations that coöperate with a spring-pressed plunger 59 operated by a knob 60. The plunger 59 is similar in construction and function to the plunger 14 described in connection with Figs. 1 and 2. The tool head 55 carries three radial tool chucks 61, in which tools 62 may be secured by means of set screws 63.

The form of device just described combines the advantages of the clutch-operated modification with great simplicity, since no driven parts are required. Any one of the tools may be selected by pulling the knob 60, turning the tool head to the proper position by hand, and allowing the plunger 59 to enter the proper opening in the indexing plate 58.

My turret attachments differ from all prior devices of this class with which I am acquainted in that the several tool spindles and the driving spindle always lie in the same plane, this strong and compact construction being rendered possible by making the tool head oscillatory instead of rotatory, as has heretofore been usual. When the tool head is arranged to rotate, it is necessary either to have the tool spindles offset from the driving spindle and driven through gears, or to rotate the tool head around an oblique axis, the several tools being also inclined with respect to the axis of the tool head. Both of these arrangements are defective, the one entailing loss of driving power and the other being inherently weak and therefore likely to break under severe shocks. My attachments also differ from prior clutch-operated devices in that the driving clutch is quickly and positively disconnected from the tool spindle as soon as the operator pulls the releasing member.

It is to be understood that the structural details which I have shown and described may be variously modified by persons skilled in the art and that no limitations are to be imposed upon my invention except such as are indicated in the appended claims.

I claim as my invention:

1. A turret attachment for machine tools comprising a support, a segmental member pivotally attached to the said support and adapted to receive a plurality of tools in radial relation to the pivotal axis of the said member and also adapted to swing across the end of the said support, and means for adjustably fixing the position of the said member.

2. A turret attachment for machine tools comprising a support, a segmental member pivotally attached to the said support and adapted to receive a plurality of tools in radial relation to the pivotal axis of the said member and disposed with their central axes in a common plane including the central axis of the said support, and means for securing the said member in any one of a plurality of positions, to bring a selected one of the said tools into working position.

3. A turret attachment for machine tools comprising a support, a segmental member pivotally attached to the said support and adapted to swing across the end of the said support and to receive a plurality of tools in radial relation to the pivotal axis of the said member, and means for securing the said member in any one of a plurality of positions, to bring a selected one of the said tools into axial alinement with the said support.

4. A turret attachment for machine tools comprising an elongate support, a segmental member pivotally attached to one end of the said support and adapted to swing across the end of the said support and to receive a plurality of tools in radial relation to the pivotal axis of the said member, and spring-pressed means for securing the said member in any one of a plurality of positions.

5. A turret attachment for machine tools comprising a support, a driving spindle carried thereby, and a segmental tool-receiving member pivotally attached to the said support for a limited degree of rotation thereon and provided with means for receiving a plurality of rotary tools that are severally adapted to be driven by the said driving spindle and have their axes of rotation disposed substantially in a common plane including the axis of rotation of the said driving spindle.

6. A turret attachment for machine tools comprising a support, a driving spindle carried thereby, and a tool-receiving member pivotally attached to the said support and provided with means for receiving a plurality of rotary tools with all of their axes of rotation disposed substantially in a common plane including the axis of rotation of the said driving spindle.

7. A turret attachment for machine tools comprising a support, a driving spindle carried thereby, a segmental member pivotally secured to the said support and adapted to receive a plurality of rotary tools in radial relation to the pivotal axis of the said member and with their axes of rotation in a common plane including the axis of rotation of the said driving spindle, and means for securing the said member in any one of a plurality of positions, to bring a selected one of the said tools into coöperative relation with the said driving spindle.

8. A turret attachment for machine tools comprising a support, a driving spindle carried thereby, a segmental member pivotally secured to the said support and adapted to receive a plurality of rotary tools in radial relation to the pivotal axis of the said member and with their axes of rotation in a common plane including the axis of rotation of the said driving spindle, and means for securing the said member in any one of a plurality of positions, to bring a selected one of the said tools into axial alinement with the said driving spindle.

9. A turret attachment for machine tools comprising a support, a driving spindle carried thereby, a segmental member pivotally secured to the said support and adapted to receive a plurality of rotary tools in radial relation to the pivotal axis of the said member and with their axes of rotation in a common plane including the axis of rotation of the said driving spindle, means for securing the said member in any one of a plurality of positions, to bring a selected one of the said tools into axial alinement with the said driving spindle, and releasable means for connecting the said selected tool to be driven by the said driving spindle.

10. A turret attachment for machine tools comprising a driving spindle, a clutch for operatively connecting any selected one of a plurality of tools to the said driving spindle, means for biasing the said clutch to inoperative position, and manually-controlled means for forcing the said clutch into operative position.

11. A turret attachment for machine tools comprising a support, a driving spindle carried by the said support, a tool-carrying head movably attached to the said support, a clutch for connecting the said driving spindle to drive any selected one of a plurality of tools, manually controlled means for forcing the said clutch into operative position, and means for positively forcing the said clutch into inoperative position when the said manually-controlled clutching means is released.

12. A turret attachment for machine tools comprising a support, a driving spindle carried thereby, a segmental member pivotally secured to swing across the end of the said support and adapted to receive a plurality of tools in radial relation to the pivotal axis of the said member, means for securing the said member in any one of a plurality of positions, to bring a selected one of the said tools into axial alinement with the said driving spindle, and a normally inoperative clutch for connecting the said selected tool to be driven by the said driving spindle.

13. A turret attachment for machine tools comprising a support, a driving spindle carried thereby, a member pivotally secured to the said support and adapted to receive a plurality of tools, means for securing the said member in any one of a plurality of positions, to bring a selected one of the said tools into axial alinement with the said driving spindle, a clutch for connecting the said selected tool to be driven by the said driving spindle, means for biasing the said clutch to inoperative position, and manually controlled means for forcing the said clutch into operative position.

14. A turret attachment for machine tools comprising a support, an indexing plate attached to the said support and pierced transversely with a plurality of spaced indexing perforations, a tool-carrying member pivotally secured to the said support, and a manually operable member adapted to enter the said perforations for fixing the position of the said tool-carrying member.

15. A turret attachment for machine tools comprising a support, an arcuate indexing plate attached to the said support and pierced transversely with a plurality of spaced indexing perforations, a hollow, segmental tool-carrying head pivotally secured to the said support, and a spring-pressed manually operable indexing pin carried by the said segmental head and adapted to enter the said perforations.

16. A turret attachment for machine tools comprising a support, a driving spindle carried thereby, means for bringing any selected one of a plurality of tools into axial alinement with the said driving spindle, a clutch sleeve surrounding the said spindle, means for biasing the said sleeve to inoperative position, and manually operable means for forcing the said sleeve into operative position.

17. A turret attachment for machine tools comprising a support, a driving spindle carried thereby, means for bringing any selected one of a plurality of tools into axial alinement with the said driving spindle, a clutch sleeve surrounding the said spindle and provided with an exterior annular groove, a ball disposed adjacent to the said groove, manually operable means for forcing the said ball into the said groove, and a spring surrounding the said driving spindle within the said sleeve for biasing the said sleeve into inoperative position.

18. A turret attachment for machine tools comprising a support, a driving spindle carried thereby, means for bringing any selected one of a plurality of tools into axial alinement with the said driving spindle, an exteriorly grooved clutch sleeve surrounding the said spindle, a spring interposed between the said spindle and the said sleeve and tending to force the said sleeve into inoperative position, a ball disposed adjacent to the said groove, and a spring-pressed, manually operable plunger for forcing the said ball into the exterior groove of the said sleeve.

19. A turret attachment for machine tools comprising a support, a driving spindle carried thereby, a tool-carrying head secured to swing through a limited arc across the end of the said support, and means for securing the said support in any desired position of angular adjustment around the axis of the said driving spindle.

20. A turret attachment for machine tools comprising a support, a driving spindle carried thereby, a tool-carrying head pivotally secured to the said support, and means for securing the said support in any desired position of angular adjustment with respect to the axis of the said driving spindle, the said means comprising a sleeve adapted to be clamped upon the said support and upon the machine tool, and clamping means associated with the said sleeve.

21. A turret attachment for machine tools comprising a support, and a member pivotally attached to the said support and adapted to receive a plurality of tools in radial relation to the pivotal axis of the said member, the axis of symmetry of the said support being intersected by the pivotal axis of the said tool-receiving member.

22. A turret attachment for machine tools comprising a support, and a member pivotally attached to the said support and adapted to receive a plurality of tools in radial relation to the pivotal axis of the said member, the axis of symmetry of the said support being disposed in a plane including the axes of symmetry of the said tools.

In testimony whereof, I have hereunto subscribed my name this 15th day of January, 1916.

CHARLES EISLER.